May 25, 1954 — W. S. PAJES — 2,679,474
PROCESS OF MAKING OPTICAL ZONE PLATES
Filed Dec. 31, 1949

INVENTOR
WOLF SZMUL PAJES
BY
Robert Harding Jr.
ATTORNEY

Patented May 25, 1954

2,679,474

UNITED STATES PATENT OFFICE 2,679,474

PROCESS OF MAKING OPTICAL ZONE PLATES

Wolf Szmul Pajes, New York, N. Y.

Application December 31, 1949, Serial No. 136,204

7 Claims. (Cl. 204—27)

This invention relates to the art of focusing electromagnetic radiation which falls outside of the visible spectrum and especially in the region of X-rays.

Visible radiation and near infra-red and near ultra-violet radiations may be brought to a focus by means of well known optical materials, such as glass, quartz, and other optically transparent materials. Radiations of much different wave lengths, however, are not responsive to the action of these refractive media. In other words these media have a refractive index of 1, the same as air, as far as these short or long wave radiations are concerned. For this reason all attempts to develop instruments, such as microscopes and spectroscopes to handle X-rays or very short ultra-violet rays have failed.

The desirability of focusing and imaging by means of such shortwave radiation lies in the fact that the resolution obtained with instruments, such as microscopes, other factors kept constant, depends on the wavelength of the illuminating radiation used. The shorter the wave length, the higher the resolution, and this in direct proportion.

It is an object of the present invention to provide a device capable of focusing electromagnetic radiation lying outside the visible range for use in instruments, such as spectroscopes, microscopes, and the like, and to provide a method for constructing such a device.

Another object of the invention is to realize a microscope which will operate with an illuminating source whose radiation consists of electromagnetic waves lying in the ultra-violet region of the spectrum.

Still another object of the invention is to realize an X-ray microscope.

Other objects will be apparent as the description of the invention proceeds.

The invention is illustrated in the accompanying drawings in which.

In the present invention I utilize interference phenomena for producing a focusing and imaging action and I accomplish this by using zone plates which by their very nature produce a focusing action caused by the disposition of opaque zones on the plates which avert destructive interference at a given point.

Figure 1:
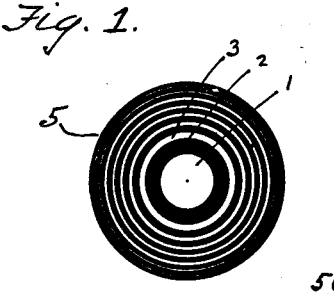
Figure 1 is a representation, greatly enlarged, of the focusing device of the invention, showing the alternate opaque and transparent rings.

The nature and construction of an optical zone plate for visible light is well known. Such a zone plate, shown in Figure 1, comprises alternate transparent and opaque circular zones 1, 2, 3, etc., of ever increasing radii. The relation between the radii R of these zones, the wave length $\lambda$ used, and the resulting focal length may be represented with very close approximation by the equation:

$$R^2 = F\lambda n \qquad (1)$$

where $n$ takes on the value of successive integers, starting with $n=1$, for successive circles which form the inner and outer edges of successive zones. From this equation the diameters may be determined by $$D = 2\sqrt{F\lambda n}$$

It follows from the above equation that the areas of all zones are the same and their magnitude may be expressed by the equation:

$$\text{Area of each zone} = \pi F\lambda \qquad (2)$$

Figure 2:
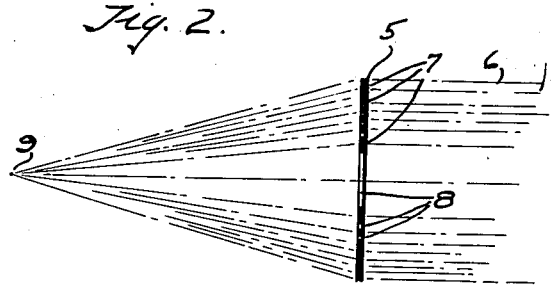
Figure 2 is a diagram representing a central section through the device of Figure 1, showing the manner in which the radiation is controlled.

Such a zone plate has the properties of a lens and may be used to focus light rays. Thus, if the plate 5 is set up in the path of parallel rays 6, as indicated in Figure 2, the opaque rings 7 will block out portions of the wave-front which would tend to interfere with the portions passing through the transparent rings 8. The result is that these latter portions remain strong and become strengthened by waves from the next transparent zone at a point 9 whose distance from the plate may be regarded as the focal length of the plate.

If a light source is placed at the focal point 9, the rays passing through the transparent rings 8 will be collimated.

From the first equation above it follows that the shorter the wave length used and the shorter the focal length desired, the smaller will be the radii of the zones. Thus, for example, if parallel yellow light whose wave length is about $5 \times 10^{-5}$ cm. is to be focussed by a zone plate at a distance of 25 centimeters, the radius $R_1$ of the first zone becomes:

$$R_1 = \sqrt{R_1^2} = \sqrt{25 \times 5 \times 10^{-5} \times 1} =$$
$$\sqrt{12.5 \times 10^{-4}} = 0.354 \text{ millimeter}$$

the radius $R_2$ of the second zone becomes:

$$R_2 = \sqrt{R_2^2} = \sqrt{25 \times 5 \times 10^{-5} \times 2} =$$
$$\sqrt{25} \times 10^{-4} = 0.5 \text{ millimeter}$$

and so on.

In accordance with the invention I use a zone plate for short ultra-violet radiation of a wave length, for example, of $\lambda = 10^{-5}$ cm.

The first radius then becomes:

$$R_1 = \sqrt{R_1^2} = \sqrt{25} \times 10^{-5} \times 1 = 0.158 \text{ millimeter}$$

and $$R_2 = 0.224 \text{ millimeter}$$

When such arrangement is used for X-rays, in accordance with the invention, the radii of the zones become much smaller. To illustrate, if it is assumed that the X-rays are generated by 12,000 volts potential difference, the resulting radiation will have a wave length of $10^{-8}$ centimeters and the required radius for the first zone for a 25 centimeter focal length would become:

$$R_1^2 = 25 \times 10^{-8} \text{ centimeters}$$
$$R_1 = 5 \times 10^{-4} \text{ centimeters} = 5 \times 10^{-3} \text{ millimeters} =$$
$$.005 \text{ millimeters, or 5 microns.}$$

From the above it will be seen that in order to handle short waves, such as X-rays, a zone plate of very fine spacial structure is necessary. In accordance with the invention I make the zone plate in the following manner which is illustrated in Figures 4 to 9 inclusive.

I first build up a structure of concentric cylinders, each cylinder having a thickness corresponding to a zone ring. To do this I start with a gold wire 10 having the exact diameter of the smallest circle of the desired zone electroplate. From the equation $R^2 = F\lambda n$, I obtain $R = \sqrt{F\lambda n}$, and since $n$ equals 1 for the smallest article, R will equal $\sqrt{F\lambda}$. From this the diameter may be represented as $D = 2\sqrt{F\lambda}$. I plate this wire with silver to a thickness corresponding to the difference between the smallest circle and the next circle which forms a silver cylinder 11. The equation for the diameter of this circle will be $D = 2\sqrt{F\lambda n}$, and since $n$ equals 2 for this circle, this equation becomes $D = 2\sqrt{F\lambda 2}$. On top of the silver cylinder I electroplate another gold layer 12 having a thickness equal to the next zone area. Then I continue alternately electroplating silver and gold layers 13, 14, 15, etc. each layer having the thickness corresponding to the width of the next larger zonal area. I continue this procedure until I have a composite rod with 30 or 40 alternate layers. The exact number of the layers is not important, but the more there are the greater the opening for the admission of the radiation.

Figure 5:
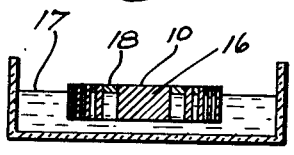
Figures 5 and 6 are sectional views of the structure of Figure 4, illustrating other steps in the process of construction.

The next step is to cut off a thin slice 16 of the composite wire, as shown greatly enlarged in Figure 5, being careful not to distort the shape of the concentric cylinders. This can be done with the use of a suitable cutting wheel of abrasive material. The surfaces of the slice thus cut off are then preferably ground to eliminate any irregularity.

This slice 16 of the concentric circles is then carefully dipped in nitric acid ($HNO_3$) 17, keeping the surfaces of the slice parallel to the surface of the acid, as indicated in Figure 5, and to such a depth that a small portion 18 of the slice remains above the level of the liquid. The nitric acid will dissolve or etch out the silver, leaving concentric cylinders of gold held together with the solid unetched portion at the top.

Figure 6:
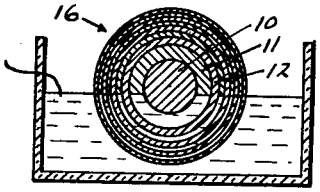
Figure 7:
Figure 7 is a perspective view of the completed device.

The unit is then turned on its side, as shown in Figure 6, and a little less than half submerged in the acid. This will etch out semi-circular rings of the silver from the last mentioned solid part of the unit. The unit is then turned on its other side and again immersed in the acid to a depth a little less than half of the diameter. This will etch out the semi-circular rings on the other side, leaving a bar 19 of solid metal extending diametrically across the unit and holding the concentric circles in a rigid structure.

The zone plate thus constructed is then washed and dried and is ready for use. It is shown greatly enlarged in Figure 7.

The zone plate will be equally effective if made with a transparent central zone instead of an opaque one, as described above. In such a case the central wire would be silver and the alternate layers gold, silver, gold, silver, etc. in the order named. Then when the acid bath is used, the central zone will be etched out and alternate succeeding layers. In either case the unit is held together by the thin bar 19 across the end.

If desired, the first immersion of the unit in the acid may be omitted, in which case the sidewise immersions will leave a web of solid metal extending from one flat surface to the other instead of the bar 19.

Figure 8:
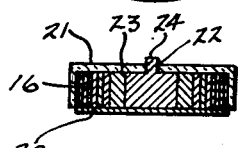
Figure 8 is an enlarged, longitudinal, sectional view of a structure illustrating a step in a modified process for making the device.
Figure 9:
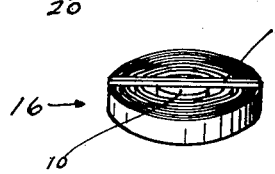
Figure 9 is a perspective view, greatly enlarged, of the completed device made in accordance with the modified process.

Another way of forming the bar 19 for holding the structure together may be accomplished in the following manner:

One surface 20 of the slice 16 is electroplated with silver, as shown in Figure 8. Then the remainder of the slice 16 is coated with etching wax, indicated at 21, and a straight groove 22 engraved in the wax with a suitable stylus diametrically across the other flat surface 23. Using the flat silver surface 20 as a means of making the electrical connection to the unit, the unit is subjected to a gold electroplating treatment which electroplates a thin bar 24 of gold along the straight engraved groove 22 across the waxed surface. Then the whole unit is immersed in nitric acid and all the silver etched away. The remaining structure is the finished zone plate, shown in Figure 9, which when properly washed is ready for use.

While gold and silver have been mentioned as the metals to be electroplated on the unit for making the alternate layers, any other combination of metals or other materials may be used, as long as alternate layers can be etched or dissolved out and the remaining layers are comparatively impervious to the radiation to be used.

Figure 3:
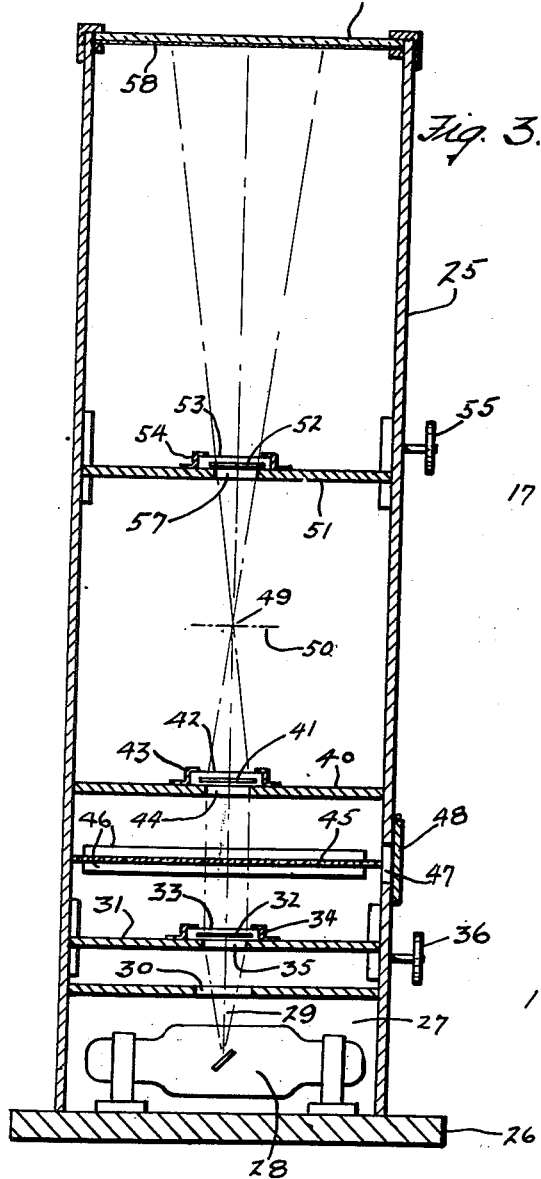
Figure 3 is a diagrammatic, sectional, longitudinal view of a microscope embodying the invention.
Figure 4:
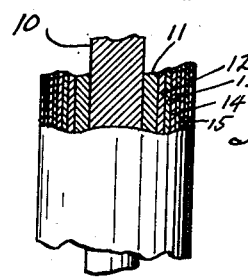
Figure 4 is a greatly enlarged, longitudinal, sectional view of a structure forming a step in the construction of a focusing device of the invention.

The zone plate may be used in various types of instruments, such as microscopes, spectroscopes, telescopes, and the like, and I have shown it in Figure 3 as applied to an X-ray microscope. The microscope comprises a casing 25, preferably impervious to X-rays, mounted on a suitable base 26. In the lowermost portion of the casing is a compartment 27 for receiving and supporting the X-ray tube 28 which is so mounted that the X-rays emitted from the tube pass upwardly within the casing. The rays, indicated at 29, pass through a suitable window 30 in the upper wall of the compartment 27 and strike a partition 31 mounted horizontally in the casing 25 which partition carries the first zone plate 32, made in accordance with the specifications given above. I preferably mount the zone plate in a quartz container 33 which protects it from dust and physical injury and which can be easily secured to the partition as by clamps 34. An aperture 35 is provided in the partition to permit the X-rays to pass through the zone plate. The partition 31 is mounted in the casing so as to bring the zone plate 32 a distance from the source of X-rays equal to the focal length of the zone plate. This has been chosen in the example given above as 25 centimeters.

The effect of the first zone plate 32 is to collimate the X-rays, thus causing them to pass upwardly in parallel lines.

Suitable adjusting mechanism, indicated by the hand screw 36 is preferably provided so as to permit adjustment of the position of the partition 31 to get the zone plate exactly the proper distance from the source of radiation.

A short distance from the partition 31 I mount another partition 40 which carries the second zone plate 41. This zone plate may be identical with the zone plate 32 and may be mounted in the same manner in a container 42 which may be secured to the partition by clamps 43. An aperture 44 in the partition permits the rays to pass unimpeded through the zone plate. The partition 40 may be fixed in the casing and the distance from the partition 31 is not important, enough space being provided to receive a slide 45 on which the specimen to be examined is mounted. Suitable guides 46 are provided on the inner wall of the casing to support the slide 45 and permit its introduction and withdrawal through a window 47 in the casing wall. A door 48, impervious to X-rays, may be hinged to the casing to cover the window 47 and prevent X-rays from being scattered.

The parallel rays passing through the specimen on the slide 45 pass through the second zone plate 41 and are focused towards the focal plane 49 thereof where an X-ray image, indicated at 50, is produced in space. Above this position I mount a third partition 51 which carries a third zone plate 52 which is the projection zone plate. This zone plate may be identical with the others and may be mounted in a container 53 and secured to the partition by clamps 54. The partition 51 is also adjustably mounted by suitable well known adjusting mechanism, indicated by the hand screw 55. The purpose of the zone plate 52 is to project the X-ray image 50 upon a fluorescent screen 56 which is mounted in the open upper end of the casing. The partition 51 is provided with a window 57 through which the X-rays pass to reach the third zone plate and the fluorescent screen. The position of the third zone plate can be adjusted to obtain a clear image of the specimen on the screen.

The fluorescent screen 56 is made of some material, such as glass, which is satisfactorily impervious to X-rays but transparent to visible light and has its under side 58 coated with a suitable material, well known in the art, to translate the X-rays into visible radiation. The operator is thus protected from X-rays while viewing the visible image.

In operating the X-ray microscope of the invention it is only necessary to adjust the lower partition 31 once when the tube 28 is placed in position to obtain the proper collimating effect of the first zone plate 32. Thereafter, no adjustment of this partition is necessary. A specimen may then be mounted on the slide 45 and the slide inserted through the window 47. The third or projecting zone plate 52 may then be adjusted by means of the screen 55 until the image of the specimen appears in visible light upon the fluorescent screen 56.

What I desire to claim and secure by Letters Patent is:

1. The method of making a zone plate which comprises the steps of providing a piece of wire having a diameter equal to $2\sqrt{F\lambda}$ where F equals the desired focal length of the zone plate and $\lambda$ equals the wave length of the radiation with which it is to be used, electroplating metal layers successively on the wire having outer diameters determined by the equations: $D=2\sqrt{F\lambda n}$, where $n$ takes on the values of successive integers, starting with $n=2$, for successive layers, alternate of said wire and layers being formed of a metal which is dissolvable in a predetermined liquid and the remainder being formed of a metal which is non-dissolvable in said liquid, cutting off a slice of said wire so plated, and dissolving out the dissolvable metal in the slice except for thin strips of solid metal between alternate layers for holding together the concentric rings of the non-dissolvable metal.

2. The method of making a zone plate, as defined in claim 1, in which the metals for the alternate layers are gold and silver and the liquid is nitric acid.

3. The method of making a zone plate, as defined in claim 2, in which the step of dissolving the alternate layers comprises the steps of immersing the slice partially in nitric acid with the axis of the slice perpendicular to the surface of the acid and to a point adjacent the upper surface of the slice, so that thin rings of the silver remain between the gold rings, turning the slice first on one side and then on the other and immersing it each time in the acid a distance slightly less than half the diameter of the slice, thereby leaving a thin bar of solid metal diametrically across the surface of the slice, and washing the slice to free it from acid.

4. The method of making a zone plate for short wave radiation which comprises the steps of providing a wire of metal nonsoluble in nitric acid, and having a diameter equal to $2\sqrt{F\lambda}$, where F equals the desired focal length of the zone plate and $\lambda$ equals the wave length of the radiation with which it is to be used, electroplating said wire were successive layers of silver and gold in the order named, the thickness of the layers being such that the successive outer diameters are determined by the equation: $D=2\sqrt{F\lambda n}$, where $n$ takes on the values of successive integers starting with $n=2$, for successive layers, the electroplating being continued until there is a number of layers, sufficient in aggregate to form a large enough entrance opening, cutting a thin slice of the wire so plated, treating the slice with nitric acid so as to dissolve out all the silver except thin bars connecting the concentric rings of gold and forming a bar of solid metal diametrically across the slice, and washing the slice to remove the acid.

5. The method of making a zone plate, as defined in claim 4, in which the steps of treating the slice with nitric acid comprises the steps of immersing the slice in nitric acid with the axis of the slice perpendicular to the surface of the acid and to a depth which will dissolve all the silver except a thin layer adjacent the upper at surface of the slice, turning the slice from one side to the other and immersing it in the acid each time to a depth slightly less than half of the diameter of the slice, whereby a thin bar of solid metal will remain diametrically across the slice to hold the concentric rings of gold in position.

6. The method of making a zone plate for use with short wavelength radiation which comprises the steps of providing a piece of wire having a diameter equal to $2\sqrt{F\lambda}$, where $F$ equals the desired focal length of the zone plate and $\lambda$ equals the wave length of the radiation with which it is to be used, electroplating metal layers successively on the wire having outer diameters determined by the equation: $D=2\sqrt{F\lambda n}$, where $n$ takes on the values of successive integers starting with $n=2$ for successive layers, alternate of said wire and layers being formed of a metal which is dissolvable in a predetermined liquid and the remainder being formed of a metal which is non-dissolvable in said liquid, cutting off a slice of said wire so plated, coating a flat surface of said slice with etching wax, cutting a groove in said wax across said surface to expose the metal beneath said wax, electroplating a layer of the non-dissolvable metal in said groove to form a thin bar of metal diametrically across the surface of said slice integral with the metal thereof, and treating the slice so as to dissolve all the dissolvable metal forming a part thereof.

7. The method of making a zone plate, as defined in claim 6, in which the dissolvable and non-dissolvable metals are silver and gold, respectively, and the liquid is nitric acid.

References Cited in the file of this patent

UNITED STATES PATENTS

| Number | Name | Date |
| --- | --- | --- |
| 1,165,558 | Thordarson | Dec. 28, 1915 |
| 1,621,814 | Sawford | Mar. 22, 1927 |
| 1,654,936 | Jones | Jan. 3, 1928 |
| 1,891,332 | Mannl | Dec. 20, 1932 |
| 2,091,863 | Kessler | Aug. 31, 1937 |
| 2,287,123 | Norris | June 23, 1942 |
| 2,301,975 | Ruska | Nov. 17, 1942 |
| 2,340,485 | Norris | Feb. 1, 1944 |
| 2,418,432 | Smith | Apr. 1, 1947 |
| 2,457,092 | Simard et al. | Dec. 21, 1948 |

FOREIGN PATENTS

| Number | Country | Date |
| --- | --- | --- |
| 230,456 | Great Britain | June 3, 1926 |